A. M. Bacon.
Motive Power.

No. 96,657. Patented Nov. 9, 1869.

Witnesses:

Inventor:
Albert M. Bacon
Per his Attorneys
Teschemacher & Stearns

United States Patent Office.

ALBERT M. BACON, OF BOSTON, MASSACHUSETTS.

Letters Patent No. 96,657, dated November 9, 1869.

MOTIVE-POWER.

The Schedule referred to in these Letters Patent and making part of the same.

*To all whom it may concern:*

Be it known that I, ALBERT M. BACON, of Boston, in the county of Suffolk, and State of Massachusetts, have invented a new and useful Motive-Power, of which the following is a full, clear, and exact description, reference being had to the accompanying drawings, making part of this specification, in which—

Figure 2:
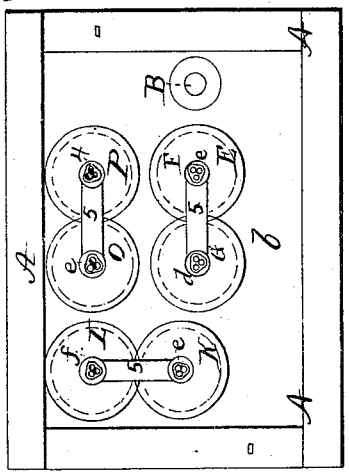
Figure 2 is an end elevation.
Figure 3:
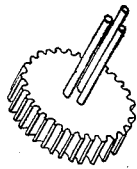
Figure 1:
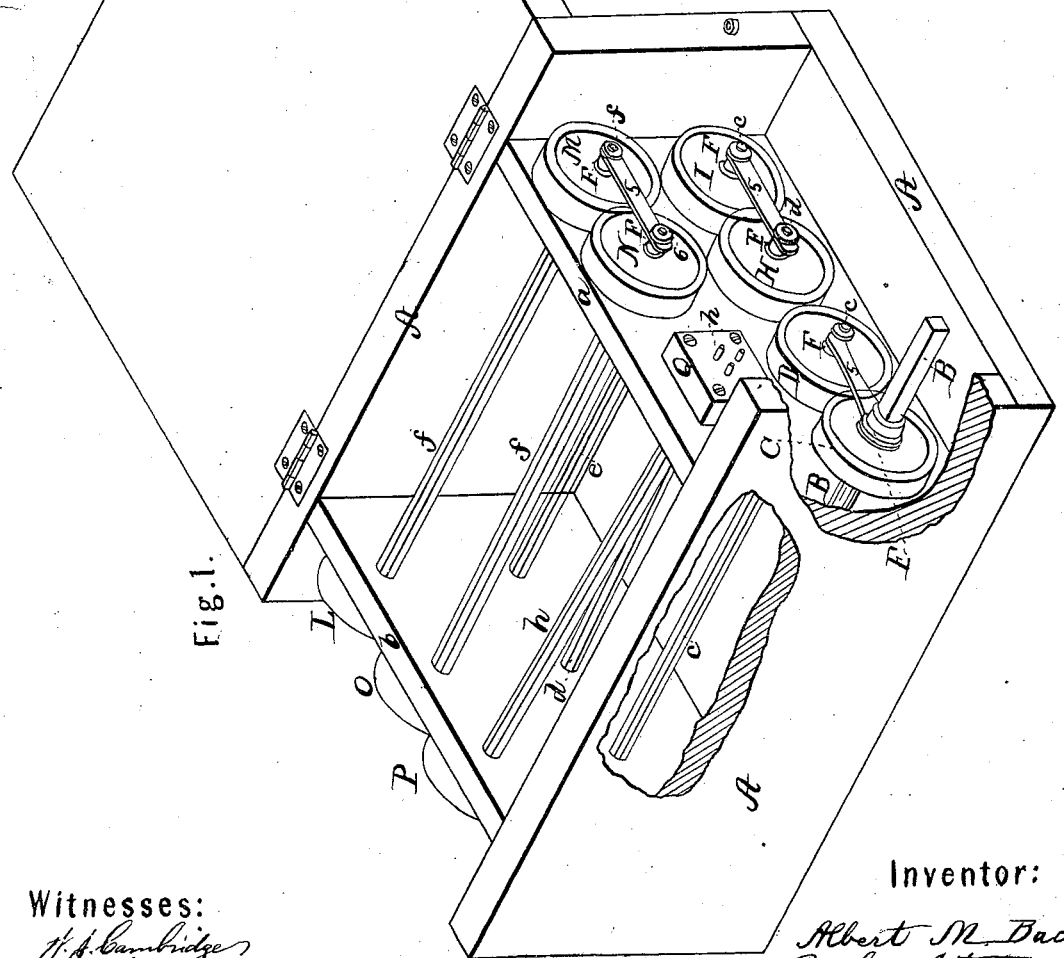
Figure 1 is a perspective view, representing a series of wires, placed within a frame, and connected by suitable gearing, the whole constituting my improved motive-power.

Figure 3, detail to be referred to.

My invention consists in a series of wires, so arranged and provided with gearing that they may be twisted, to form a spring, the tension or power of which will correspond to the degree of twist given to the wires, the release of the spring, and the consequent unwinding of the wires, creating the desired force, the expenditure of which may be regulated by suitable mechanism, the power being applied in driving various descriptions of stationary machinery, or for propelling cars, carriages, boats, and other apparatus now actuated by steam, water, heat, or other well-known motive-power.

To enable others skilled in the art to understand and use my invention, I will proceed to describe the manner in which I have carried it out.

In the said drawings—

A represents a box or frame-work, across the interior, and through the parallel sides *a b* of which passes a shaft, B, having secured, at one of its ends, a cog-wheel, C, which drives a similar cog-wheel, D, into and through which pass the ends of a series of three wires, *c*, of tempered steel, or other suitable metal, which extend through the side *a*, and across the interior of the frame-work, and through the side *b*, where their opposite ends are firmly secured to a gear, E, similar to those C D, both ends of the series of wires passing through their respective wheels, and having collars F slipped over them, for the reception of couplings or links 5, in order to prevent the separation of the wheels C D, (intended to engage with each other,) and for keeping the wheel E in gear with a similar wheel, G, on the extremities of a series of three wires, *d*, (similar to the series *c*,) passing through the interior of the box or frame-work, and at a short distance from the series *c*.

H is another similar gear, (secured to the opposite ends of the wires of the series *d*,) which meshes into a corresponding wheel, I, through which pass the ends of another series of wires, *e*, extending across the box, the wheels H and I being kept in gear by a coupling or link, 5, similar to that already described.

The extremities of the series, *e*, of wires opposite to those secured to the wheel I, are firmly secured to a gear, K, similar to those previously described, which is coupled with and drives a corresponding gear, L, on the extremities of another series, *f*, of wires, passing through the sides *a b*, and across the frame-work.

M is a cog-wheel, to which are secured the opposite ends of the series *f* of wires, the wheel M engaging with and driving a corresponding gear, N, secured to another series, *g*, of wires, to the opposite ends of which is also secured a gear, O, which, in its turn, is coupled with and drives a gear, P, secured to the ends of another series, *h*, of wires, the opposite ends of this last series being rigidly fastened to a block, Q, attached to the side of the frame-work.

The several wheels, C, D, E, G, H, I, K, L, M, N, O, and P, are provided with holes, for the reception of the ends of the wires, as seen in fig. 3, by which construction, when power is applied, by crank or otherwise, to revolve the shaft B, the several gears are caused to turn, and each wire of each series is twisted around the remaining two wires of its series, and a spring of great tension is thus produced, the degree and duration of the power being determined by the number of wires or series of wires employed, and the number of revolutions given the shaft B.

In practice, I intend to employ wires from six to twenty feet in length, and to place a large number of them close together, within a suitable box or frame-work, thereby multiplying the power to the required amount.

If preferred, instead of a series of three wires, a single wire, with its ends securely fastened to the cog-wheels, (so as to prevent it from turning independently therein,) or two or more wires, may be employed; and, instead of the wire or wires being circular in cross-section, they may be square, without departing from the spirit of my invention.

By means of the construction above described, any amount of power may be created, and its expenditure regulated by suitable mechanism, so that it may be applied in propelling street-carriages, velocipedes, railway-cars, boats, &c., or for driving machinery in buildings.

Claim.

What I claim as my invention, and desire to secure by Letters Patent, is—

A series of wires, arranged either singly or in groups, and connected by suitable gearing, substantially as and for the purpose set forth.

ALBERT M. BACON.

Witnesses:
P. E. TESCHEMACHER,
N. W. STEARNS.